United States Patent
Raphael et al.

(10) Patent No.: US 11,347,891 B2
(45) Date of Patent: May 31, 2022

(54) DETECTING AND OBFUSCATING SENSITIVE DATA IN UNSTRUCTURED TEXT

(71) Applicant: International Business Machines Corporation, Armonk, NY (US)

(72) Inventors: Roger C. Raphael, San Jose, CA (US);
Rajesh M. Desai, San Jose, CA (US);
Iun Veng Leong, Union City, CA (US);
Ramakanta Samal, San Jose, CA (US);
Ansel Blume, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 477 days.

(21) Appl. No.: 16/445,366

(22) Filed: Jun. 19, 2019

(65) Prior Publication Data
US 2021/0064781 A1 Mar. 4, 2021

(51) Int. Cl.
*G06F 21/62* (2013.01)
*G06K 9/62* (2022.01)
*G06F 21/60* (2013.01)
*G06V 10/75* (2022.01)

(52) U.S. Cl.
CPC ........ *G06F 21/6254* (2013.01); *G06F 21/602* (2013.01); *G06K 9/6257* (2013.01); *G06V 10/757* (2022.01)

(58) Field of Classification Search
CPC . G06F 21/6254; G06F 21/602; G06K 9/6211; G06K 9/6257
See application file for complete search history.

(56) References Cited

U.S. PATENT DOCUMENTS

| | | | |
|---|---|---|---|
| 7,069,427 | B2 | 6/2006 | Adler et al. |
| 8,341,104 | B2 | 12/2012 | Manickam et al. |
| 8,649,552 | B2 | 2/2014 | Balakrishnan et al. |
| 9,015,802 | B1 | 4/2015 | Muthusrinivasan et al. |

(Continued)

OTHER PUBLICATIONS

Chawla et al., "SMOTE: Synthetic Minority Over-sampling Technique", Journal of Artificial Intelligence Research 16, 2002, pp. 321-357.

(Continued)

*Primary Examiner* — Joseph P Hirl
*Assistant Examiner* — Stephen T Gundry
(74) *Attorney, Agent, or Firm* — Daniel M. Yeates

(57) ABSTRACT

Disclosed is a computer-implemented method to identify and anonymize personal information, the method comprising analyzing a first corpus with a personal information sniffer, wherein the first corpus includes unstructured text, wherein the personal information sniffer is configured to detect a set of types of personal information, and wherein the personal information sniffer produces a first set of results. The method comprises analyzing the first corpus with a set of annotators, wherein each annotator is configured to identify all instances of a type of personal information in the corpus, and wherein the set of annotators produces a second set of results. The method comprises comparing the first set of results and the second set of results, determining, the first set of results does not match the second set of results, and updating, based on the determining, the personal information sniffer.

19 Claims, 10 Drawing Sheets

(56) References Cited

U.S. PATENT DOCUMENTS

| | | | |
|---|---|---|---|
| 9,223,987 B2 | 12/2015 | Yoshihama | |
| 9,923,931 B1* | 3/2018 | Wagster | H04L 63/30 |
| 10,949,616 B1* | 3/2021 | Shenoy | G06F 16/313 |
| 10,978,056 B1* | 4/2021 | Challa | G06F 16/3344 |
| 11,019,107 B1* | 5/2021 | Wagster | H04L 43/10 |
| 11,115,410 B1* | 9/2021 | Hanson | H04L 63/0861 |
| 11,178,117 B2* | 11/2021 | Linton | H04L 63/0428 |
| 2005/0027664 A1* | 2/2005 | Johnson | G06F 40/45 706/12 |
| 2006/0143459 A1* | 6/2006 | Villaron | G06F 21/6254 713/176 |
| 2007/0061393 A1* | 3/2007 | Moore | G06Q 10/10 709/201 |
| 2008/0240425 A1* | 10/2008 | Rosales | G06F 21/6254 380/28 |
| 2017/0177904 A1 | 6/2017 | Bilodeau et al. | |
| 2018/0322119 A1* | 11/2018 | Dubbels | G06F 40/237 |
| 2019/0213354 A1* | 7/2019 | Bhowan | G06F 40/30 |
| 2019/0354583 A1* | 11/2019 | Ralhan | G06K 9/6257 |
| 2020/0195618 A1* | 6/2020 | Linton | G06F 21/6263 |
| 2020/0210775 A1* | 7/2020 | Patel | G06N 20/00 |
| 2020/0287736 A1* | 9/2020 | Zhuk | G06N 3/0454 |
| 2020/0344251 A1* | 10/2020 | Jeyakumar | H04L 51/12 |
| 2020/0356603 A1* | 11/2020 | Bao | G06F 16/907 |
| 2020/0364665 A1* | 11/2020 | Shapiro | G06Q 40/08 |
| 2020/0380311 A1* | 12/2020 | Lourentzou | G06K 9/6257 |
| 2020/0389486 A1* | 12/2020 | Jeyakumar | G06F 16/353 |
| 2020/0396258 A1* | 12/2020 | Jeyakumar | H04L 63/1441 |

OTHER PUBLICATIONS

Mikolov et al., "Distributed Representations of Words and Phrases and their Compositionality", 2013, 9 pages.

Wikipedia, "tf-idf", From Wikipedia, the free encyclopedia, last edited on Feb. 17, 2019, printed Mar. 4, 2019, 7 pages, https://en.wikipedia.org/wiki/Tf%E2%80%93idf.

Unknown, "Welcome to the Apache LUMA project", Apache UIMA, The Apache Software Foundation, printed Mar. 4, 2019, Copyright © 2006-2013, The Apache Software Foundation, 4 pages, https://uima.apache.org/.

Unknown, "scikit-learn Machine Learning in Python", scikit learn, printed Mar. 4, 2019, 4 pages, http://scikit-learn.org/.

Unknown, "gensim topic modelling for humans", printed Mar. 4, 2019, 2 pages, https://radimrehurek.com/gensim/.

Guirguis et al., "BronzeGate: Real-time Transactional Data Obfuscation for GoldenGate", EDBT 2010, Mar. 22-26, 2010, pp. 645-650.

Liu et al., "Privacy-Preserving Scanning of Big Content for Sensitive Data Exposure with MapReduce", CODASPY'15, Mar. 2-4, 2015, pp. 195-206.

Mell et al., "The NIST Definition of Cloud Computing", Recommendations of the National Institute of Standards and Technology, Sep. 2011, 7 pages.

\* cited by examiner

DETECTING AND OBFUSCATING SENSITIVE DATA IN UNSTRUCTURED TEXT

BACKGROUND

The present disclosure relates to data privacy, and, more specifically, to identification and transformation of sensitive data.

Information privacy is a concern at the forefront of modern society. With the advent of big data, companies and institutions gather users' personal information for a variety of purposes. Such information is often gathered with the intent of improving a service or understanding user behavior. Sometimes this information is collected for future analytical needs of the organization and/or its business partners. Other times, the personal information is inadvertently saved when logging user interactions with the organization's services.

SUMMARY

Disclosed is a computer-implemented method to identify and anonymize personal information, the method comprising analyzing a first corpus with a personal information sniffer, wherein the first corpus includes unstructured text, wherein the personal information sniffer is configured to detect a set of types of personal information, and wherein the personal information sniffer produces a first set of results. The method comprises analyzing the first corpus with a set of annotators, wherein each annotator is configured to identify all instances of a type of personal information in the corpus, and wherein the set of annotators produces a second set of results. The method comprises comparing the first set of results and the second set of results, determining, the first set of results does not match the second set of results, and updating, based on the determining, the personal information sniffer. Further aspects of the present disclosure are directed to systems and computer program products containing functionality consistent with the method described above.

The present Summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
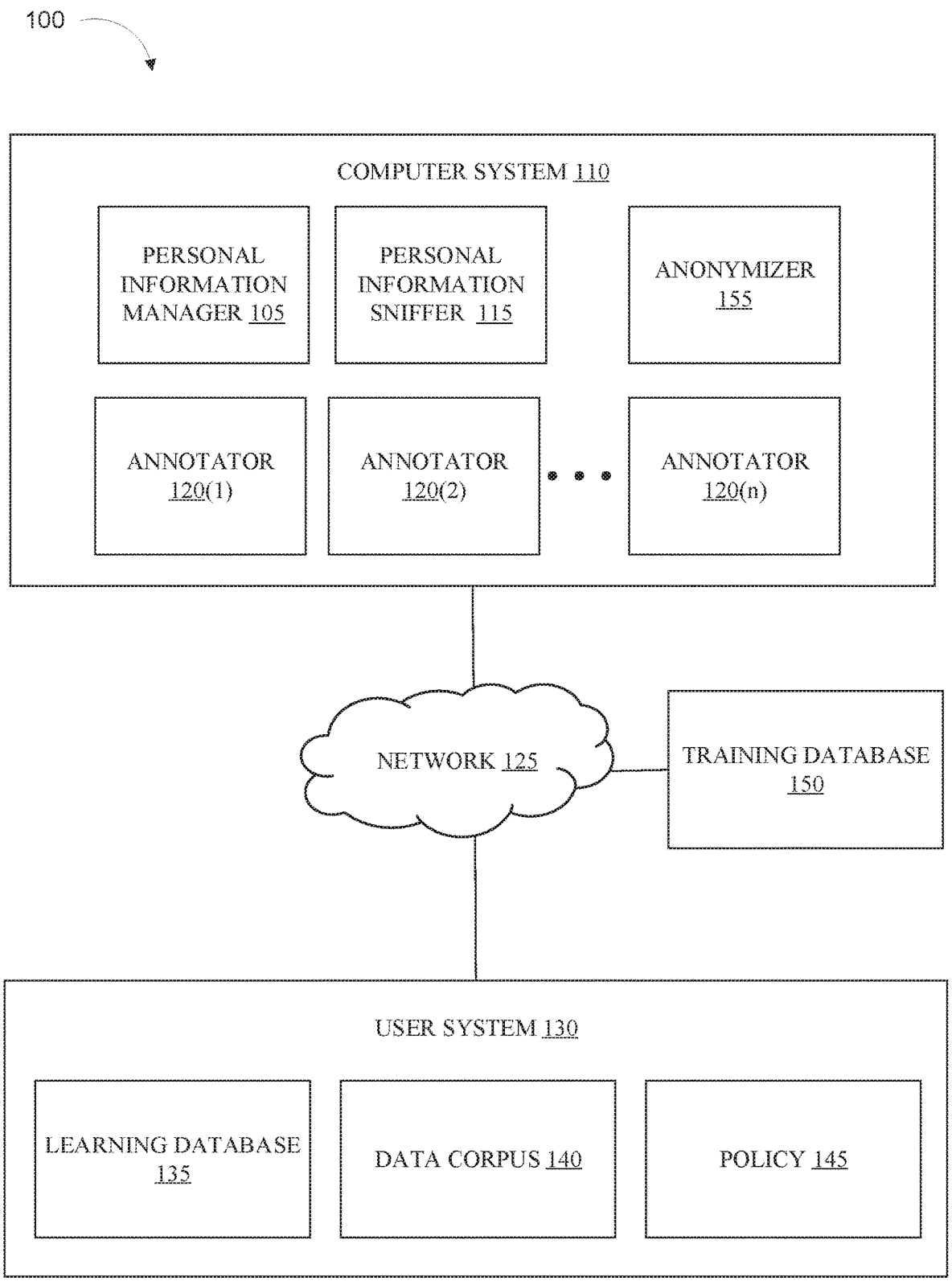
FIG. 1 illustrates a functional diagram of a computing environment suitable for operation of a personal information manager, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate to data privacy, and, more specifically, to identification and transformation of personal data. Aspects of the present disclosure may be better appreciated in light of the aforementioned applications.

Information privacy (e.g., data privacy or data protection) is the relationship between the collection and dissemination of data, the technology used to collect and disseminate data, the public's expectation of privacy of the data, and the legal and political issues that dictate what is considered to be private data. Privacy concerns arise whenever personally identifiable information or other sensitive information is collected, stored, used, or otherwise disseminated.

Information privacy is a concern at the forefront of modern society. With the advent of big data, companies and institutions gather users' personal information for a variety of purposes. Such information is often gathered with the intent of improving a service or understanding user behavior. Sometimes this information is collected for future analytical needs of the organization and/or its business partners. Other times, the personal information is inadvertently saved when logging user interactions with the organization's services.

The term personally identifiable information (PII) may cover any type of information that can be used to identify an individual based on that information. Some examples of PII include social security numbers, European identifiers, driver license numbers, and the like. Sensitive personal information (SPI) refers to information that does not identify an individual but is related to an individual and communicates information that is private or could potentially harm the individual. Examples of SPI include biometric data, genetic information, gender, trade union memberships, sexual orientation, and the like. For purposes of this disclosure, sensitive information (SI), sensitive data, personal information (PI), and personal data all refer to any data that is either PII, SPI, and/or other data that may be considered confidential.

The storage of non-anonymized personal information can pose privacy risks to clients, and legal risks to the information holders. Indiscriminately disseminating stored data may not only infringe upon user privacy, but also be grounds for lawsuits, even if unintentional. Companies intending to comply with privacy laws, such as the General Data Protection Regulation (GDPR), face a tremendous challenge to maintain and protect the petabytes of data they collect and store in accordance with the privacy laws.

Embodiments of the current disclosure include a personal information manager. In some embodiments, the personal information manager can identify and obfuscate personal information in a corpus of text.

Embodiments of the present disclosure recognize that searching an entire database for sensitive information may be unreasonable or infeasible for large amounts of data, especially when only a small percentage of the stored data can be considered personal information. This difficulty is compounded by the fact that organizations frequently have a constant influx and outflux of data for which they have no existing application to filter out personal information in real time.

Embodiments of the present disclosure recognize that casting a wide net and removing any data which could potentially contain personal information can lead to the loss of valuable information which is not personal information. Additionally, aggressive removal tactics make service issues more challenging to debug and decreases the data's utility for analytics.

Embodiments of the present disclosure can address the above issues. Embodiments of the present invention allow a user (e.g., an organization) to precisely and efficiently identify the location of pre-specified types/categories of personal information in a corpus of text. Additionally, some embodiments, allow the user to perform automated anonymization and/or redaction of the personal information in the corpus.

Embodiments of the current disclosure include a personal information manager. In some embodiments, the personal information manager can identify and obfuscate personal information in a corpus of text. In some embodiments, the corpus can include unstructured text (e.g., natural language). Unstructured text refers to text of a language (e.g., English, Spanish, etc.) of any form. This contrasts with well described structured data (e.g., tabular data, JavaScript Object Notation "JSON" data, etc.).

Embodiments of the present disclosure use a multi-modal approach to detect personal information. In some embodiments, the first mode uses a personal information sniffer (sniffer, or PI sniffer) to detect the types of personal information that are in a corpus. In these embodiments, the sniffer utilizes artificial intelligence and machine learning to detect types of personal information at a relatively low computing run-time cost. In some embodiments, the second mode utilizes a set of annotators, where each annotator in the set corresponds to at least one type of personal information detected in the first step. The annotators further analyze and flag the precise location of the personal information. The annotators have higher computing cost than the sniffer. Each annotator is configured to detect and annotate a specific type of personal information (e.g., birthdays and names would be separate annotators).

In some embodiments, the multi-modal approach can reduce the amount of processing power and/or memory used to identify all personal information in a corpus by limiting the number of high cost annotators that need to be run. The sniffer can be trained to detect pattern or context in which personal information occurs. When the sniffer doesn't detect a particular type or types of personal information, the associated annotators are bypassed thereby saving computing resources.

Embodiments of the present disclosure allow for a user-configurable policy to help determine the set of annotators to be used and to determine whether the set of annotators is sufficient. In some embodiments, the policy assists in determining how the results of the annotators should be anonymized.

In some embodiments, the personal information sniffer is self-training. This allows a user to incorporate new types of personal information into the detection scheme. All that is needed is to add one or more annotators and add rules to the policy to process the annotations. The personal information sniffer utilizes training data and a feedback loop to learn to detect the new type of personal information. These embodiments can overcome some deficiencies of bootstrapping in training the sniffer.

The aforementioned advantages are example advantages, and embodiments exist that can contain all, some, or none of the aforementioned advantages while remaining within the spirit and scope of the present disclosure.

Referring now to various embodiments of the disclosure in more detail, FIG. 1 is a representation of a computing environment, generally labeled 100, that is capable of running a personal information manager 105, in accordance with one or more embodiments of the present disclosure. Many modifications to the depicted environment may be made by those skilled in the art without departing from the scope of the disclosure as recited by the claims.

Computing environment 100 includes computer system 110, network 125, user system 130, and learning/training database 150. Network 125 can be, for example, a telecommunications network, a local area network (LAN), a wide area network (WAN), such as the Internet, or a combination of the three, and can include wired, wireless, or fiber optic connections. Network 125 may include one or more wired and/or wireless networks that are capable of receiving and transmitting data, voice, and/or video signals, including multimedia signals that include voice, data, and video information. In general, network 125 may be any combination of connections and protocols that will support communications between computer system 110, user system 130, and learning/training database 150, and other computing devices (not shown) within computing environment 100.

Computer system 110 can be a standalone computing device, a management server, a web server, a mobile computing device, or any other electronic device or computing system capable of receiving, sending, and processing data. In other embodiments, computer system 110 can represent a server computing system utilizing multiple computers as a server system, such as in a cloud computing environment. In some embodiments, computer system 110 represents a computing system utilizing clustered computers and components (e.g., database server computers, application server computers, etc.) that act as a single pool of seamless resources when accessed within computing environment 100. In some embodiments computer system 110 includes personal information manager 105, personal information sniffer 115, anonymizer 155, and annotator 120(1), annotator 120(2) to annotator 120(*n*) where "n" is an integer index, collectively referred to as annotators 120.

Personal information sniffer 115 can be any combination of hardware and/or software that forms an artificial intelligence system capable of determining whether a type of personal information is present in a corpus of data. In some embodiments personal information sniffer 115 can use one or more neural networks (not shown) in training and processing data. In some embodiments, personal information sniffer 115 includes neural networks as part of the machine learning and artificial intelligence (AI) processes. In some embodiments, personal information sniffer 115 is a recurrent neural network (RNN) such as, for example, a Long Short-Term Memory (LSTM) neural network.

In some embodiments, personal information sniffer 115 is computationally inexpensive relative to annotators 120. Personal information sniffer 115 can quickly and efficiently process the corpus and predict if personal information may be present in the corpus. In some embodiments, personal information sniffer 115 predicts the type of personal information present. In some embodiments, personal information sniffer 115 is trained to detect a pattern and/or context within which personal information appears.

In some embodiments, personal information sniffer 115 is trained using training data. In some embodiments, training data can include documents, books, articles, and other similar data with known classes of personal information. In some embodiments, the training data can be stored in training database 150. In some embodiments, personal information sniffer 115 is a part of personal information manager 105. In some embodiments, personal information sniffer 115 can be a part of user system 130, training database 150, and/or any other computing devices (not shown) in computing environment 100. Personal information sniffer 115 is discussed in further detail in relation to FIG. 4 below.

Annotators 120 can be any combination of hardware and/or software that is configured to identify instances of personal information, or a component of instances of a type (or class, or category) of personal information. In some embodiments each of annotators 120 is configured to identify a specific pattern indicative of a particular type of personal information (e.g. email address annotator or social security number annotator). In some embodiments, types or components of personal information includes, but is not limited to, first names, last names, dates (e.g., birthdates, medical procedure dates), social security numbers, and addresses. In some embodiments, annotators can be executed in parallel due their specific and independent natures. In some embodiments, the results from annotator 120(1) can be fed into and used by annotator 120(2) and/or annotator 120(3). For example, a first annotator is configured to detect first names, a second annotator is configured to detect last names, and the output of these can be fed into a third annotator which is configured to detect a full name. As another example, a first annotator is configured to output all dates in a document. A second annotator further refines the dates to determine which dates are birthdates. In some embodiments, the user may add and/or remove individual annotators from annotators 120. For example, if a law changes and birthdays are no longer considered PI, a user may want to remove the annotator that can identify PI. Also, the birthday annotator can be added for similar or any other reason.

In some embodiments, annotators 120 analyze the entire corpus that was reviewed by personal information sniffer 115. In some embodiments, annotators 120 analyze a portion of the corpus that was reviewed by personal information sniffer 115. In these embodiments, personal information sniffer 115 can provide an approximate location where the type of personal information was detected then annotators 120 can review that area plus a predefined amount of data prior to and after the approximate location. The approximate location can be based on policy 145. For example, policy 145 can direct the sniffer to scan a predefined amount of text at a time (e.g., 1 page, 1 paragraph, 500 words, etc.).

In some embodiments, annotators 120 are part of personal information manager 105. In some embodiments, annotators 120 can be a part of user system 130, training database 150, and/or any other computing devices (not shown) in computing environment 100.

In some embodiments, annotators 120 utilize a combination of dictionary and regular-expression-based approaches to locate spans in the text corresponding to the type of personal information. In some embodiments, annotators 120 utilize unstructured information management architecture (UIMA) framework to streamline the annotation process and perform the rule application step.

Anonymizer 155 can be any combination of hardware and/or software configured to anonymize data. In some embodiments, anonymizer 155 can use a variety of techniques to hide information including redaction, deletion, replacement, hashing, generalization, dictionary-substitution and other similar techniques. The anonymization of personal information can take any form to comply with policy 145, where the policy 145 can be a user agreement, a company policy, a law, a regulation(s), and/or any other privacy/security guidance. In some embodiments, each class of personal information can be anonymized the same as or differently than a different class of personal information in the same corpus. In some embodiments, anonymizer 155 anonymizes each class of personal information in accordance with policy 145. In some embodiments, anonymizer 155 is a part of personal information manager 105. In some embodiments, anonymizer 155 can be a part of user system 130, training database 150, and/or any other computing devices (not shown) in computing environment 100.

User system 130 can be a standalone computing device, a management server, a web server, a mobile computing device, or any other electronic device or computing system capable of receiving, sending, and processing data. In other embodiments, user system 130 can represent a server computing system utilizing multiple computers as a server system, such as in a cloud computing environment. In some embodiments, user system 130 represents a computing system utilizing clustered computers and components (e.g., database server computers, application server computers, etc.) that act as a single pool of seamless resources when accessed within computing environment 100. User system 130 includes learning database 135, data corpus (corpus) 140, and policy 145.

Learning database 135 can be a collection of data of past results of personal information manager 105 on user system 130. In some embodiments, learning database 135 tracks changes in policy 145. In some embodiments, the tracked changes can be used by personal information manager 105, personal information sniffer 115, and/or training database 150. In some embodiments, learning database 135 can record and store instances of false positives and false negatives. In some embodiments, learning database 135 can be a part of computing environment 100, personal information manager 105, and/or training database 150.

Data corpus 140 can be any set of data stored on user system 130. In some embodiments, data corpus 140 is any set of data that can be analyzed by personal information manager 105. In some embodiments, data corpus 140 is data that is being stored on user system 130. In some embodiments, data corpus 140 is data currently being input into user system 130 (e.g., customer support chat, customer form, internet usage data, etc.). In these embodiments, data corpus 140 can be analyzed by personal information manager 105 as it is received by user system 130. In some embodiments, data corpus 140 is a set of data being distributed by user system 130 (e.g., an outgoing email, public announcement, etc.). In these embodiments, personal information manager 105 can analyze the data before it is sent outside of user system 130, thereby preventing an inadvertent disclosure of personal information. In some embodiments, data corpus 140 can be a part of computing environment 100, personal information manager 105, and/or training database 150.

Policy 145 can be a set of rules configured to protect personal information. In some embodiments, policy 145 defines which of annotators 120 should be run. In some embodiments, policy 145 includes all annotators 120 available for all the types and sub-types of personal information. In some embodiments, policy 145 defines how anonymizer 155 should handle each instance of personal information annotated by annotator 120.

In some embodiments, policy 145 includes confidence thresholds. In some embodiments, the confidence thresholds correspond to a confidence score output by personal information manager 105 and/or annotators 120. In some embodiments, policy 145 includes an overall confidence threshold. The overall confidence score indicates personal information manager 105 confidence that all personal information in data corpus 140 has been annotated. In some embodiments, policy 145 includes a type threshold for each type of personal information. The type threshold represents the level of certainty that the types of personal information identified by personal information sniffer 115 are in data corpus 140.

In some embodiments, policy 145 is customizable. In some embodiments, policy 145 can be updated by a user via user system 130. In some embodiments, the user can add and/or delete one or more of annotators 120 from a set of annotators 120 associated with a type of personal information. In some embodiments, the user can adjust the confidence thresholds. In various embodiments, policy 145 can be stored in computer system 110, personal information manager 105, and/or training database 150.

Training database 150 can be a set of data used to train and/or update personal information sniffer 115 and/or learning database 135. In some embodiments, training database 150 contains a set of documents containing a known quantity of instances and types of personal information. In some embodiments, a portion of the set of documents have one instance of one type of personal information. In some embodiments, a portion of the set of documents have multiple instances of one type of personal information. In some embodiments, a portion of the set of documents have one instance of multiple types of personal information. In some embodiments, a portion of the set of documents has multiple instances of multiple types of personal information.

In some embodiments, training database 150 can be updated. In some embodiments, training database 150 is updated by a user, such that the user adds and/or removes documents/training material from training database 150. In some embodiments, training database 150 is updated automatically. In some embodiments, training database 150 can receive feedback from personal information manager 105 after data corpus 140 is analyzed. In these embodiments, personal information manager 105 adds and/or removes training material from training database 150. In some embodiments, training database 150 is updated to conform with changes in laws, user agreements, regulations, and/or policy 145. In various embodiments, training database 150 is stored in personal information manager 105, computer system 110, or user system 130.

In various embodiments, computing environment 100 allows personal information manager 105 to identify and obfuscate personal information in a corpus of unstructured text (e.g., data corpus 140). In these embodiments, personal information sniffer 115, at relatively low computing cost, identifies types of personal information in data corpus 140. A set of annotators, (e.g. annotators 120), annotates specific instances of personal information, and anonymizer 155 anonymizes the instances of personal information based on policy 145. In these embodiments, training database 150, and results stored in learning database 135 update personal information sniffer 115 to make the overall process more efficient.

Figure 2:
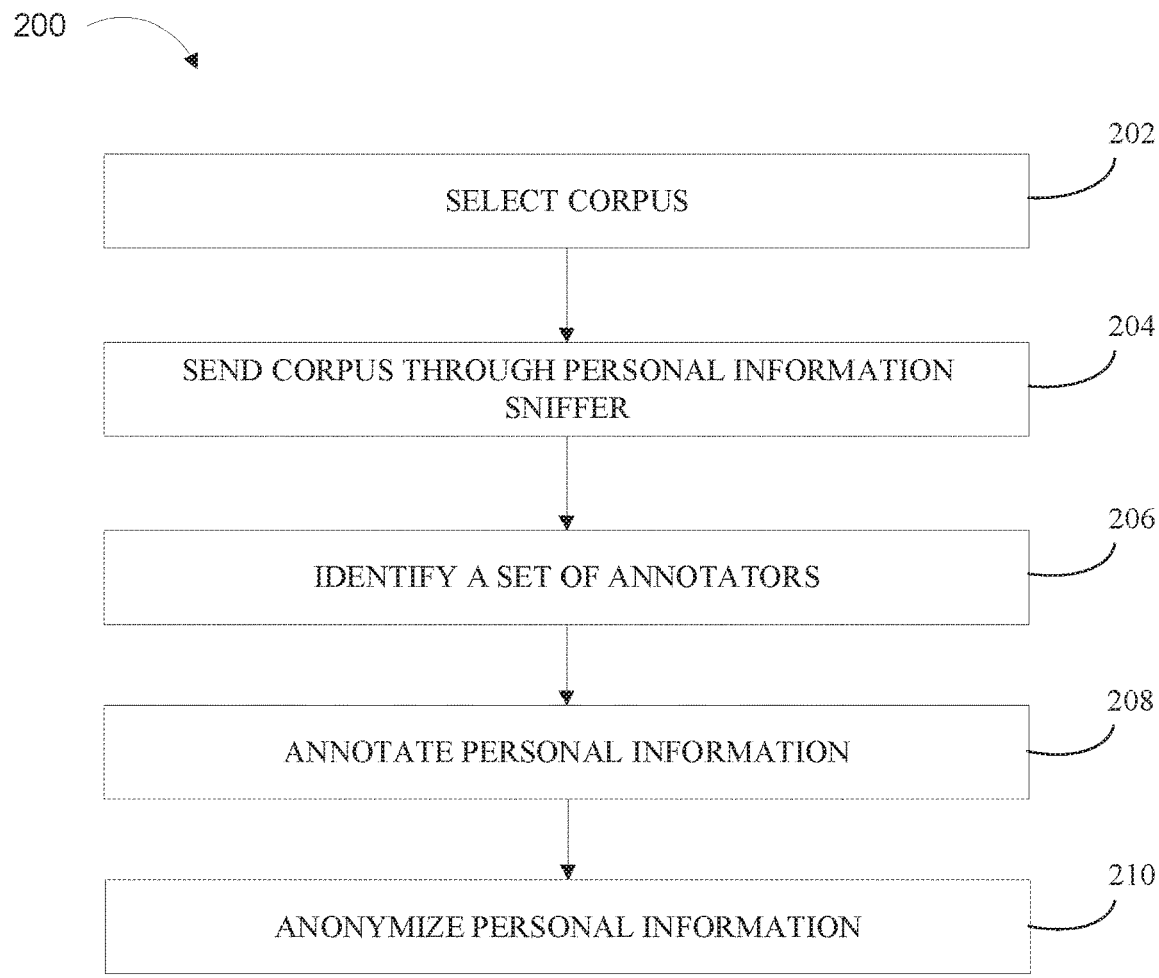
FIG. 2 illustrates a block diagram of an example method of identifying and anonymizing personal information, in accordance with some embodiments of the present disclosure.

FIG. 2 depicts a flowchart of an example method, method 200, for identifying and anonymizing personal information that can be performed in a computing environment (e.g., computing environment 100 and/or computer system 110). One or more of the advantages and improvements described above for identifying and anonymizing personal information can be realized by the method 200, consistent with various embodiments of the present disclosure.

Method 200 can include more or fewer operations than those depicted. Method 200 can include operations in different orders than the order depicted. Likewise, the method 200 can include operations that occur simultaneously rather than sequentially. Many modifications to the depicted method may be made by those skilled in the art without departing from the spirit and scope of the present disclosure. Method 200 can be implemented by one or more processors, a personal information manager (e.g., personal information manager 105 of FIG. 1), a computing device (e.g., computer system 110 of FIG. 1), or a different combination of hardware and/or software. In various embodiments, the various operations of method 200 are performed by one or more of personal information manager 105, computer system 110, user system 130, training database 150, and/or other computing devices.

At operation 202, personal information manager 105 selects a corpus. In some embodiments, the corpus is data corpus 140. In some embodiments, the corpus selected is a portion of the data in data corpus 140. In some embodiments, the corpus is a continuous stream of incoming data. In some embodiments, the corpus is all of or a portion of data saved in a database.

At operation 204, personal information manager 105 sends the corpus through personal information sniffer 115. In some embodiments, personal information sniffer 115 identifies one of more types of personal information that may be in the corpus. In some embodiments, personal information sniffer 115 uses artificial intelligence (e.g., machine learning) to identify the types of personal information.

In some embodiments, personal information sniffer 115 outputs a type confidence score correlated with each type of personal information. The type confidence score can represent the likelihood each type of personal information is present in the corpus. The type confidence score can be output as a percentage, as a number, or ranked relative to other types of personal information (e.g., type A most likely, type B second most likely etc.).

At operation 206, personal information manager 105 identifies a set of annotators to use on the corpus. The set of annotators can be as small as one annotator, as large as all annotators, or any number in between. In some embodiments, the set of annotators is based on the results of operation 204. In some embodiments, the set of annotators is based on policy 145. In some embodiments, the set of annotators is based on the type confidence scores. In some embodiments, the set of annotators includes all annotators for each type confidence score that is above a predefined threshold. In some embodiments, there is a single threshold for all of the type confidence levels. For example, say the predefined threshold for all annotators is 0.75 and type A confidence score is 0.82, the type B confidence score is 0.21, and the type C confidence score is 0.94. In such an example, the annotators for type A personal information and type C personal information would form the set of annotators since they are the annotators of the set of annotators with a confidence score exceeding the predefined threshold.

In some embodiments, each type confidence level has a unique threshold. For example, say the type A threshold is 0.75, the type B threshold is 0.20, and the type C threshold is 0.95 and the type A confidence score is 0.82, the type B confidence score is 0.21, and the type C confidence score is 0.94. In this scenario, the annotators for type A personal information and type B personal information would form the set of annotators. In various embodiments the predefined threshold is stored in policy 145 and can be adjusted by the user.

In some embodiments, the set of annotators includes a specific annotator. For example, the annotators for type A personal information are included in the set of annotators regardless to the results of operation 206. In some embodiments, the set of annotators includes all annotators.

At operation 208, personal information manager 105 annotates each instance of personal information in the corpus. In some embodiments, the annotators identify a specific pattern that indicates that personal information is present in a particular location. In some embodiments, the annotations include recording the location and type of personal information.

It is possible that one piece of information in the corpus can be annotated by multiple annotators or fall under multiple types of personal information (e.g., a first name can be under given name type and full name types of personal information.). In some embodiments, policy 145 can include a hierarchy of types of personal information. The personal information will be treated as the highest ranked type in the remaining steps. In some embodiments, the most restrictive uses (e.g., deletion) can be applied to data that has been annotated by multiple annotators.

At operation 210, personal information manager 105 anonymizes the annotations. In some embodiments, the annotations are anonymized by anonymizer 155. In some embodiments, anonymization is any technique to place/secure personal information. It can include redaction, deletion, replacement, hashing, generalization, and other similar techniques. In some embodiments, the annotations are anonymized according to policy 145. In various embodiments, different types of personal information are anonymized in different ways. For example, type A can be redacted, and type B can be generalized (e.g., "12345" to "#####"). In some embodiments, anonymization includes outputting the anonymized corpus (e.g., a redacted document).

Figure 3A:
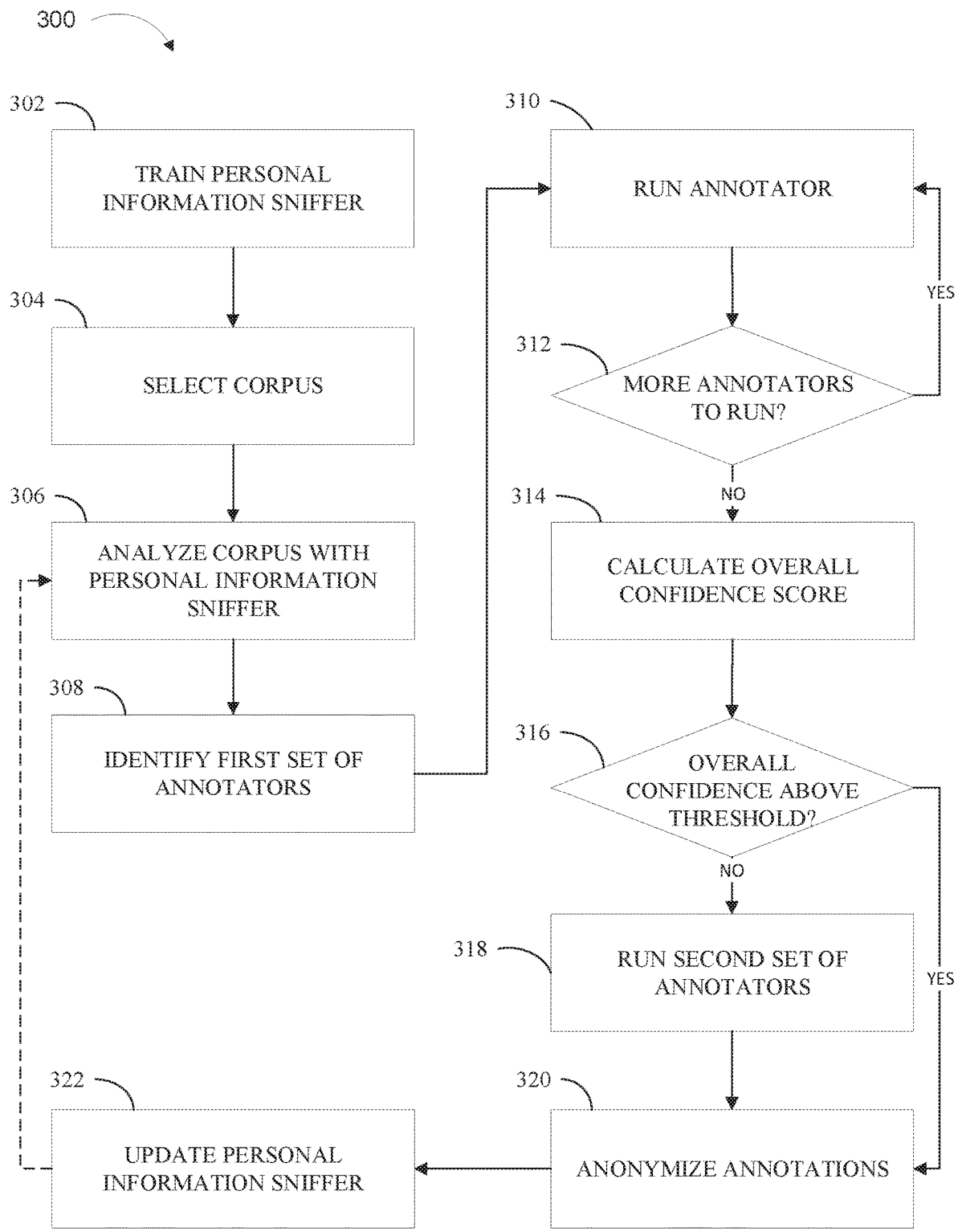
FIG. 3A illustrates a block diagram of an example method of training and using a personal information manager, in accordance with some embodiments of the present disclosure.
Figure 3B:
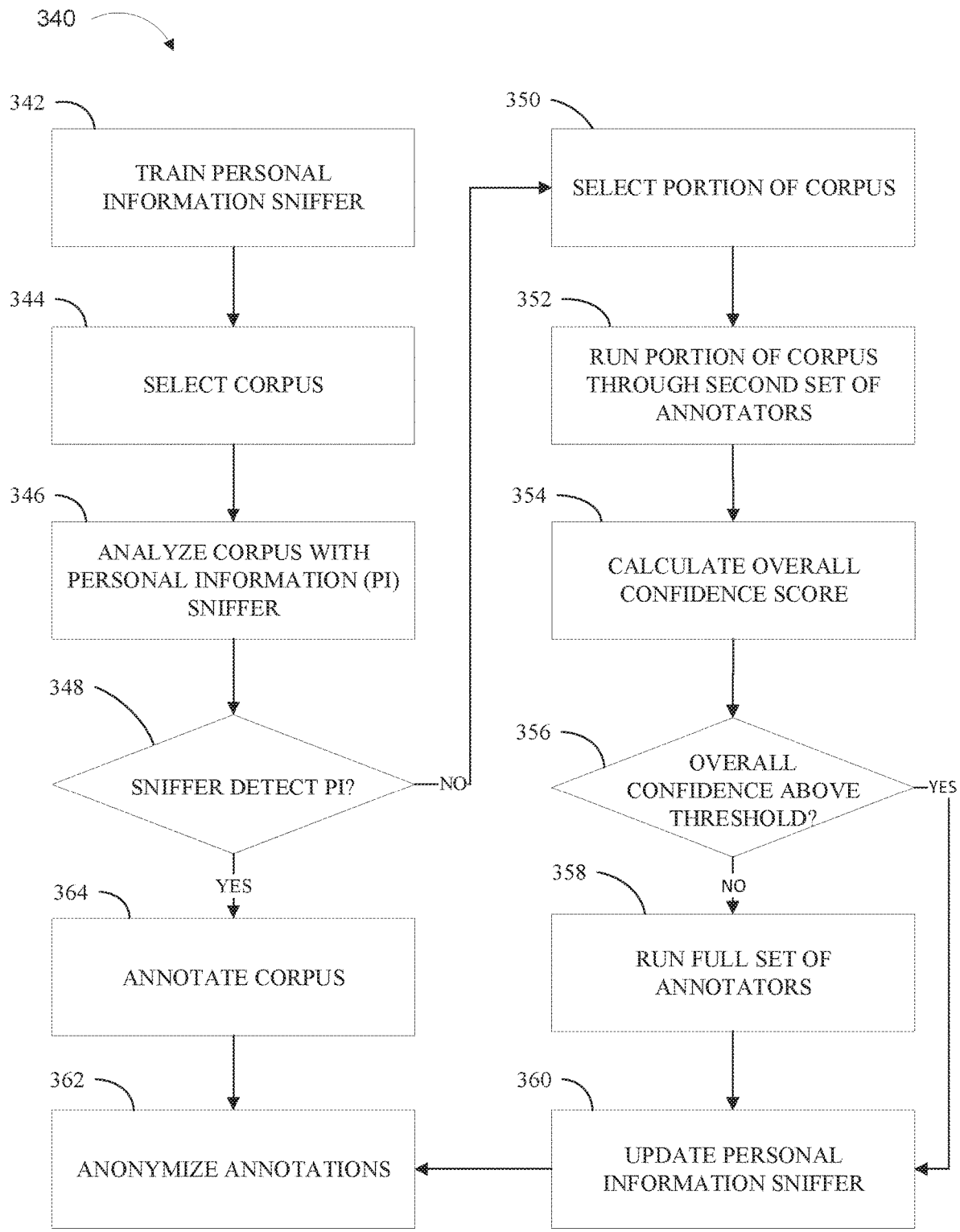
FIG. 3B illustrates a block diagram of an example method of training and updating a personal information manager, in accordance with some embodiments of the present disclosure.
Figure 3C:
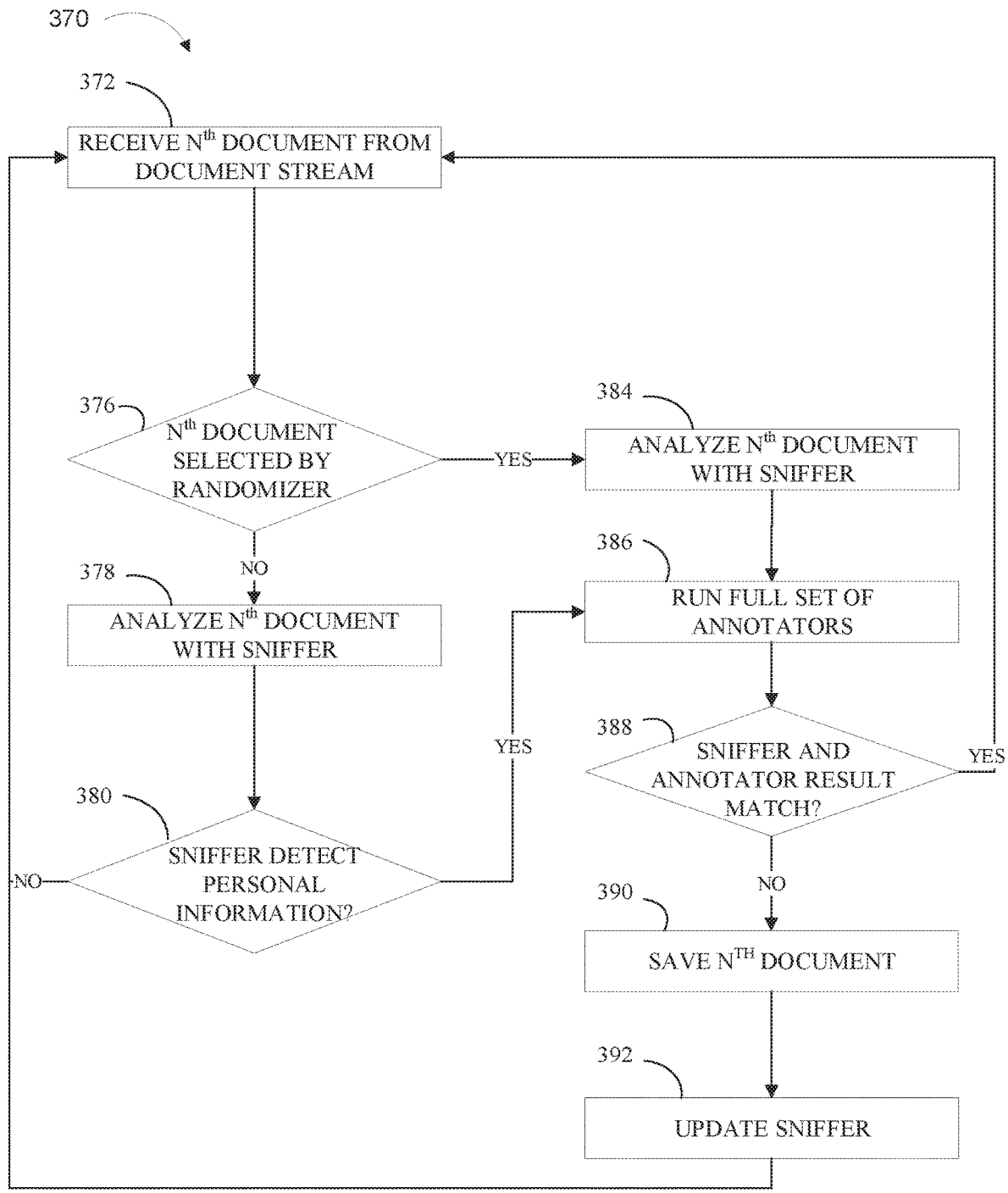
FIG. 3C illustrates a block diagram of an example method of training and updating a personal information manager, in accordance with some embodiments of the present disclosure.

FIGS. 3A, 3B and 3C depicts a flowchart of an example method, method 300, 340, and 370 for training and updating a model (e.g., personal information sniffer 115) in a computing environment (e.g., computing environment 100 and/or computer system 110) that can identify the presence of personal information in unstructured text. One or more of the advantages and improvements described above for identifying and anonymizing personal information can be realized by the method 300, consistent with various embodiments of the present disclosure.

Method 300 can include more or fewer operations than those depicted. Method 300 can include operations in different orders than the order depicted. Likewise, the method 300 can include operations that occur simultaneously rather than sequentially. Many modifications to the depicted method may be made by those skilled in the art without departing from the spirit and scope of the present disclosure. Method 300 can be implemented by one or more processors, a personal information manager (e.g., personal information manager 105 of FIG. 1), a computing device (e.g., computer system 110 of FIG. 1), or a different combination of hardware and/or software. In various embodiments, the various operations of method 300 are performed by one or more of personal information manager 105, computer system 110, user system 130, training database 150, and/or other computing devices.

At operation 302, personal information manager 105 trains a personal information sniffer. In some embodiments, the personal information sniffer is personal information sniffer 115 of FIG. 1. In some embodiments, the personal information sniffer 115 is trained using training data stored in training database 150. Operation of the personal information sniffer 115 is discussed in relation to FIG. 4. In some embodiments, personal information sniffer 115 is trained using a synthetic minority over-sampling technique (SMOTE).

In some embodiments, personal information sniffer 115 is trained by feeding documents with known content. In some embodiments, the personal information sniffer 115 is trained by adjusting the model after false positives and/or false negatives. In some embodiments, the model is trained analyzing results via a feedback loop (e.g., operation 322).

At operation 304, personal information manager 105 selects a corpus. In some embodiments, the corpus is data corpus 140. In some embodiments, the corpus selected is a portion of the data in data corpus 140. In some embodiments, the corpus is a continuous stream of incoming data. In some embodiments, the corpus is all, or a portion of data saved in a database. In some embodiments, operation 304 is consistent with operation 202 of FIG. 2.

At operation 306, personal information manager 105 sends the corpus through personal information sniffer 115. In some embodiments, personal information sniffer 115 identifies one of more types of personal information that may be in the corpus. In some embodiments, personal information sniffer 115 uses artificial intelligence (e.g., machine learning) to identify the types of personal information. In some embodiments, operation 306 is consistent with operation 204 of FIG. 2.

Also, at operation 306, in some embodiments, personal information sniffer 115 outputs a type confidence score correlated with each type of personal information. The type confidence score can represent the likelihood each type of personal information is present in the corpus. The type confidence score can be output as a percentage, as a number, or ranked relative to other types of personal information (e.g., type A most likely, type B second most likely, etc.).

At operation 308, personal information manager 105 identifies a first set of annotators to use on the corpus. In some embodiments, operation 308 is consistent with operation 206 of FIG. 2.

The first set of annotators can be as small as one annotator, as large as all annotators, or any number in between. In some embodiments, the first set of annotators is based on the results of operation 306.

In some embodiments, if the personal information manager 105 does not identify at least one annotator to include in the first set of annotators, then a predefined set of annotators can be selected. The predefined set of annotators can include any number of annotators. In some embodiments, the predefined set of annotators can be consistent with the second set of annotators as described in operation 318. In these embodiments, if one or more annotators in the predefined set of annotators detect an instance of personal information, the results are used to update personal information sniffer 115, then reperform operation 306. In some embodiments, if one or more annotators in the predefined set of annotators detect an instance of personal information, personal information manager 105 proceeds to operation 322 (described in further detail below), then returns to operation 306.

In some embodiments, the first set of annotators is based on policy 145. In some embodiments, the first set of annotators is based on the type confidence scores. In some embodiments, the first set of annotators includes all annotators for each type confidence score that is above a predefined threshold. In some embodiments, there is a single threshold for all of the type confidence levels. For example, say the predefined threshold for all annotators is 0.75 and the type A confidence score is 0.82, the type B confidence score is 0.21, and the type C confidence score is 0.94. Then the annotators for type A personal information and type C personal information would form the first set of annotators.

In some embodiments, each type confidence level has a unique threshold. For example, say the type A threshold is 0.075, the type B threshold is 0.020, and the type C threshold is 0.95 and the type A confidence score is 0.82, the type B confidence score is 0.21, and the type C confidence score is 0.94. In this scenario the annotators for type A personal information and type B personal information would form the first set of annotators. In various embodiments the predefined threshold is stored in policy 145 and can be adjusted by the user.

In some embodiments, the first set of annotators includes a specific annotator. For example, the annotators for type A personal information is included in the first set of annotators agnostic to the results of operation 206. In some embodiments, the first set of annotators includes all annotators.

At operation 310, personal information manager 105 runs an annotator from the first set of annotators. In some embodiments, operation 310 includes the actions of operation 208 of FIG. 2. In some embodiments, personal information manager 105 runs the annotator by processing the corpus through the annotator. In some embodiments, running the annotator includes storing the results. In some embodiments, the results can be stored in learning database 135.

In some embodiments, the annotators identify a specific pattern that indicates personal information is present in a particular location. In some embodiments, the annotations include recording the location and type of personal information.

It is possible that one character (data unit) in the corpus can be annotated by multiple annotators or fall under multiple types of personal information (e.g., a first name can be under given name type and full name types of personal information.). In some embodiments, policy 145 can include a hierarchy of types of personal information. The personal information will be treated as the highest ranked type in the remaining steps. In some embodiments, the most restrictive uses (e.g., deletion) can be applied to data that has been annotated by multiple annotators.

In some embodiments, personal information manager 105 records an annotator has been run after it has been operated. In some embodiments, the completion is stored in learning database 135.

At operation 312, personal information manager 105 determines if there are additional annotators to run from the first set of annotators. If there are additional annotators, (decision tree "YES" branch), then personal information manager 105 returns to operation 310. If there are no additional annotators to run (decisions tree "NO" branch) then personal information manager 105 proceeds to operation 314. In some embodiments, personal information manager 105 determines if there are additional annotators to run by comparing the first set of annotators to the annotators that have been run.

At operation 314, personal information manager 105 calculates an overall confidence score. In some embodiments, the overall confidence score represents the overall confidence that personal information manager 105 has identified all desired instances of personal information in the corpus. Factors that can be considered in calculating the overall confidence score include, but are not limited to, the total instances of personal information found, the types known by the training model compared to the types annotated, the first set of annotators, the type confidence levels, and other similar factors.

At operation 316, personal information manager 105 determines if the overall confidence score is above a second predetermined threshold. If the overall confidence score is above the second predetermined threshold (decision tree "YES" branch), then personal information manager 105 proceeds to operation 320. If the overall confidence score is below the second predetermined threshold (decisions tree "NO" branch) then personal information manager 105 proceeds to operation 318. In some embodiments, personal information manager 105 determines if the overall confidence score is above the threshold by comparing the two values. In some embodiments, the second predetermined threshold is stored in policy 145 and is adjustable by the user.

In some embodiments, if the overall confidence score is below the second predetermined threshold, then personal information manager 105 returns to operation 306 after completing operations 318, 320, and 322. In some embodiments, if the overall confidence score is below the second predetermined threshold, then personal information manager 105 proceeds to operation 322 without performing operation 318 and/or operation 320.

At operation 318, personal information manager 105 runs a second set of annotators. In some embodiments, the second set of annotators includes any number of annotators that are not part of the first set of annotators. In some embodiments, the annotators in the second set of annotators are determined by policy 145. In some embodiments, the annotators in the second set of annotators are determined based on the results of operations 306, 308, and/or 314. In some embodiments, the second set of annotators includes all annotators not included in the first set of annotators. In some embodiments, running the annotators in operation 318 can be consistent with running the annotators in operation 310 (e.g., annotating instances of personal information).

At operation 320, personal information manager 105 anonymizes the annotations. In some embodiments, operation 320 can be consistent with operation 210 of FIG. 2. In some embodiments, the annotations are anonymized by anonymizer 155. In some embodiments, anonymization is any technique to place/secure personal information. It can include redaction, generalization, anonymization, deletion, gentrification, etc. In some embodiments, the annotations are anonymized according to policy 145. In various embodiments, different types of personal information are anonymized in different ways. For example, type A can be redacted, and type B can be generalized (e.g., "12345" to "#####"). In some embodiments, anonymization includes outputting the anonymized corpus (e.g., a redacted document).

At operation 322, personal information manager 105 updates personal information sniffer 115. In some embodiments, updating the personal information sniffer includes analyzing the results of the method 300. In some embodiments, updating personal information sniffer 115 includes storing all results in learning database 135. In some embodiments, updating personal information sniffer 115 includes adjusting the process used in operation 306 to increase one or both of the type confidence levels and the overall confidence level. In some embodiments, adjusting personal information sniffer 115 increases the overall efficiency of personal information manager 105. It allows personal information sniffer 115 to efficiently and accurately detect the types of personal information present in data corpus 140, and it reduces the number of computationally expensive annotators that need to be run.

Referring now to FIG. 3B, method 340 can include more or fewer operations than those depicted. Method 340 can include operations in different orders than the order depicted. Likewise, the method 340 can include operations that occur simultaneously rather than sequentially. Many modifications to the depicted method may be made by those skilled in the art without departing from the spirit and scope of the present disclosure. Method 340 can be implemented by one or more processors, a personal information manager (e.g., personal information manager 105 of FIG. 1), a computing device (e.g., computer system 110 of FIG. 1), or a different combination of hardware and/or software. In various embodiments, the various operations of method 340 are performed by one or more of personal information manager 105, computer system 110, user system 130, training database 150, and/or other computing devices.

Operations 342, 344, and 346 are consistent with operations 302, 304, and 306 of FIG. 3A, respectively. Method 300 assumes personal information sniffer 115 will find personal information, while method 340 does not make the same assumption. However, both the methods 300 and 340 are embodiments of training and updating personal information sniffer 115.

At operation 348, personal information manager 105 determines if personal information sniffer 115 detected one or more instances of personal information. In some embodiments, operation 308 can use the methods of operations 204 and 206 of FIG. 2. In some embodiments, personal information sniffer 115 searches the corpus for a pattern corresponding to a type of personal information. In some embodiments, personal information sniffer 115 return a Boolean (e.g., yes or no, 0 or 1) indicating if yes or no saying if personal information is present in the corpus.

If the personal information sniffer 115 does find personal information (conditional block "YES" branch), then personal information manager 105 proceeds to operation 364. If the personal information sniffer does not find personal information (conditional block "NO" branch), personal information manager 105 proceeds to operation 350.

At operation 350, personal information manager 105 selects a portion of the corpus. In some embodiments, the portion of the corpus is selected to validate the results of personal information sniffer 115. The portion can be any amount of the corpus up to the entire corpus. The portion of the corpus is configurable. The amount can be a percentage (e.g. 10% of the corpus), a repeating amount (e.g., 1 of every 5 pages), and/or other similar parameters. Operation 310 and the following operations can be a feedback loop to validate the sniffer is adequately predicting the presence of personal information.

At operation 352, personal information manager 105 runs the portions of the corpus through a second set of annotators. In some embodiments, the second set of annotators includes any number of annotators. In some embodiments, the annotators in the second set of annotators are determined by policy 145. In some embodiments, the annotators in the second set of annotators are determined based on the results of operations 306. In some embodiments, running the annotators in operation 312 can be consistent with running the annotators in operation 206 of FIG. 1, except the set of annotators may differ.

Operations 354, 356, 358, 360, and 362 are consistent with operations 316, 318, 320, and 322 of method 300, respectively.

Referring back to operation 348, if the personal information sniffer 115 does find personal information (conditional block "YES" branch), then personal information manager 105 proceeds to operation 364. At operation 364, personal information manager 105 annotates the corpus. Operation 364 can be consistent with operations 308 through 318 of method 300. It follows the steps used when personal information sniffer detects personal information.

Referring now to FIG. 3C, method 370 can include more or fewer operations than those depicted. Method 370 can include operations in different orders than the order depicted. Likewise, the method 370 can include operations that occur simultaneously rather than sequentially. Many modifications to the depicted method may be made by those skilled in the art without departing from the spirit and scope of the present disclosure. Method 370 can be implemented by one or more processors, a personal information manager (e.g., personal information manager 105 of FIG. 1), a computing device (e.g., computer system 110 of FIG. 1), or a different combination of hardware and/or software. In various embodiments, the various operations of method 370 are performed by one or more of personal information manager 105, computer system 110, user system 130, training database 150, and/or other computing devices.

At operation 372, personal information manager 105 receives a $n^{th}$ document from a document stream. A document stream can be any set of documents that is configured to be processed/analyzed by personal information manager 105. In some embodiments, each of the $n^{th}$ documents can include one or more corpora.

At operation 376, personal information manager 105 determines if the $n^{th}$ document is selected by a randomizer. The randomizer can be any combination of hardware and/or software to configured to select one or more documents from the document stream. The method and number of documents selected can be determined by policy 145 and can be configured by a user. The selected documents are not necessarily random, rather some of the are chosen to check to accuracy of personal information sniffer 115. In some embodiments, a preset percentage of the documents are selected (e.g. 10%). In some embodiments, the preset percentage can be dynamically changed based on the confidence of personal information sniffer 115. In some embodiments, a pattern is used to select the documents (e.g., every $5^{th}$ document, select 2 then don't select the next 7, etc.). In some embodiments, documents are randomly selected.

In some embodiments, there is an added benefit to having the randomizer select documents prior to either operation 378 of operation 384, despite the two operations being essentially equivalent. Selecting the documents to be analyzed by both personal information sniffer 115 the set of annotators may increase the effectiveness of updating the model.

If the $n^{th}$ document is selected by the randomizer (conditional block "YES" branch), personal information manager 105 proceeds to operation 384. If the $n^{th}$ document is not selected by the randomizer (conditional block "NO" branch), personal information manager 105 proceeds to operation 378.

At operation 378, personal information manager 105 analyzes the document with personal information sniffer 115. In some embodiments, operation 378 can be consistent with operation 204 of FIG. 2, 306 of FIG. 3A, and 346 of FIG. 3B.

At operation 380, personal information manager 105 determines if personal information sniffer 115 detected personal information in the document. In some embodiments, operation 380 is consistent with operation 348 of FIG. 3B.

If personal information sniffer 115 does detect personal information (conditional block "YES" branch), then personal information manager 105 proceeds to operation 386. If personal information manager 105 does not detect personal information (conditional block "NO" branch), then personal information manager 105 returns to operation 372. In some embodiments, the $N+1^{th}$ document is received and processed in response to completed operation 380.

At operation 384, personal information manager 105 analyzes the document with personal information sniffer 115. In some embodiments, operation 378 can be consistent with operation 204 of FIG. 2, 306 of FIG. 3A, and 346 of FIG. 3B.

At operation 386, personal information manager 105 runs the full set of annotators on the documents. In some embodiments, operation 386 is consistent with operation 358 of FIG. 3B.

At operation 388, personal information manager 105 determines if the results of personal information sniffer 115 and the full set of annotators match. In some embodiments, the results can match if both either found personal information, or if neither found personal information in the document. In personal information sniffer 115 does find personal information and the annotators do not (or vice versa), then the results do not match.

If the results match (conditional block "YES" branch), then personal information manager 105 returns to operation 372. In some embodiments, the $N+1^{th}$ document is received and processed in response to determining the results match. If the results do not match (conditional block "NO" branch), then personal information manager 105 proceeds to operation 390.

If the results do not match (conditional block "NO" branch), then personal information manager 105 proceeds to operation 390. At operation 390, personal information manager 105 saves the $n^{th}$ document. In some embodiments, the documents are saved in training database 150. In some embodiments, the documents are saved in learning database 135. In some embodiments, the documents, are saved in computer system 110.

In some embodiments, the stored documents include information about the results of personal information sniffer 115 and/or annotators 120. This information can be used to update or modify personal information sniffer 115, by retraining the model and/or annotators 120. In some embodiments, saving the documents includes making a copy of the document.

At operation 392, personal information manager 105 updates personal information sniffer 115. In some embodiments, the update occurs at a predetermined interval. For example, the interval can be time period (e.g., weekly), after a number of documents are processed, after a predefined number of results do not match, etc. In some embodiments, policy 145 determines the interval, and the interval can be configured by a user. In some embodiments, a user can initiate the update, in according to the change in PII definition.

In some embodiments, the document stream is a set of documents stored in one or more databases (e.g., training database 150). In some embodiments, the stream of documents is continuously and/or sporadically received from a specific source via network 125. For example, the stream of documents can be all emails being sent external to a company's servers. Each email can be considered a document, and the total of them can be the document stream.

Consider an example where a user adds a new birthday annotator to the full set of annotators. This is an indication that for the given solution, birthday is now considered as PII information. Initially, personal information sniffer 115 will not be trained to identify birthdays. As document that may contain birthdays are selected by the randomizer and they contain birthdays, that data is fed back to personal information sniffer 115. To increase the speed of the training, the number of documents selected by the randomizer and/or the frequency of updating the model can be increased in policy 145. This allows the model to update with less user interaction. As the model gets better at identifying birthdays, the user can reduce the number of documents selected by the randomizer and/or the frequency of updating the model thereby saving those computing resources. However, the model will be continually fine-tuned.

Similar benefits can be seen if an annotator is removed from the full set of annotators. For example, the user removed the birthday annotator from the set of annotators. Initially, personal information sniffer 115 will identify that the document has a birthday. That document will be sent to the annotators, which won't find the birthday. The model will then stop identifying birthdays. This can occur with little or no user intervention. In this case, the only intervention necessary is adding and/or removing annotators from the full set of annotators.

Figure 4:
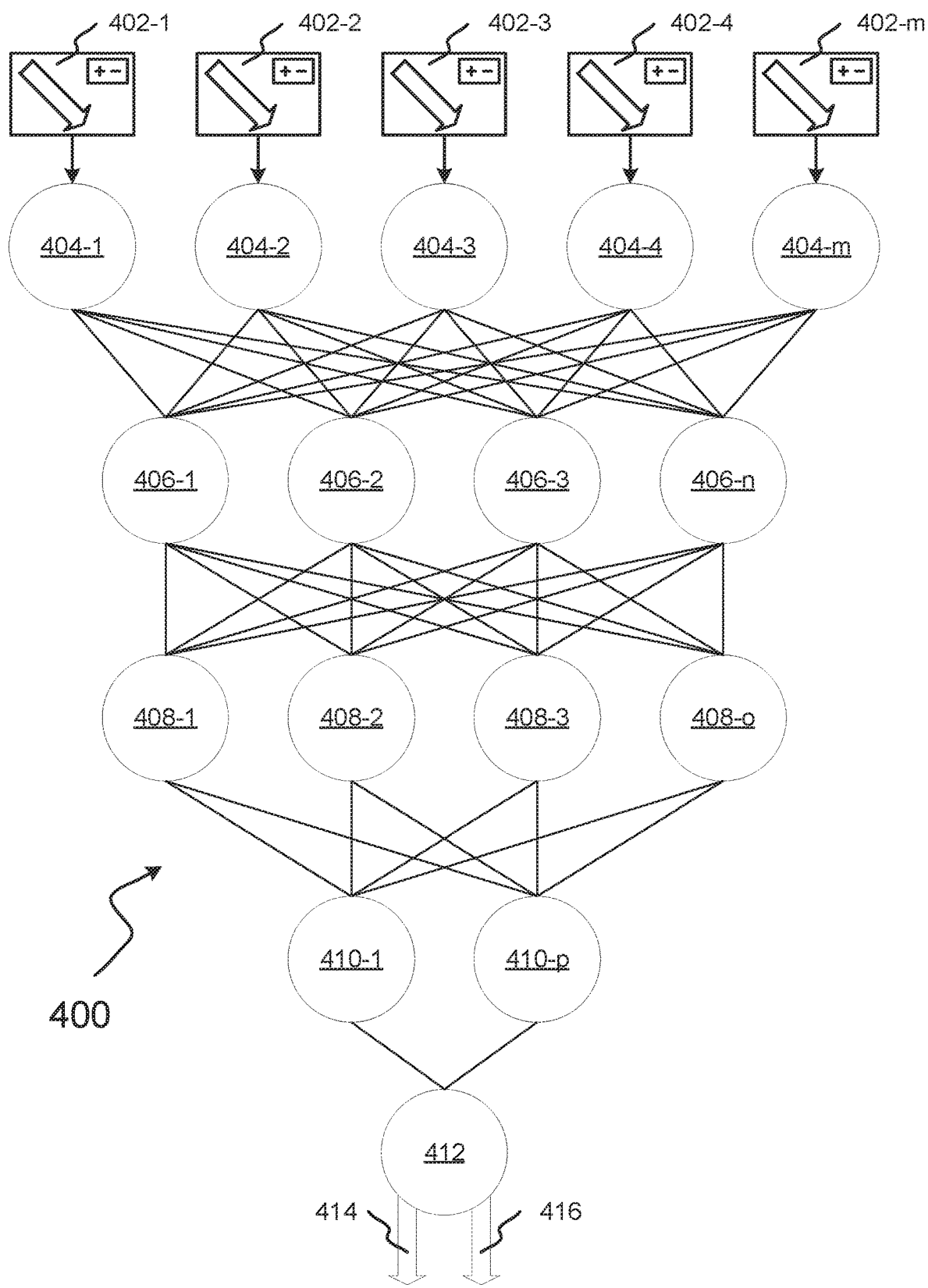
FIG. 4 depicts an example neural network that can be specialized to predict types of personal information in a corpus, in accordance with embodiments of the present disclosure.

FIG. 4 depicts an example neural network 400 that can be specialized to train one or more personal information sniffers that can be used to identify personal information in unstructured text. For example, neural network 400 can be specialized to perform operation 204 of FIG. 2, operation 302, and/or operation 306 of FIG. 3.

Neural network 400 can be a classifier-type neural network, or convolutional neural network. Neural network 400 can be part of a larger neural network. For example, neural network 400 can be nested within a single, larger neural network, connected to several other neural networks, or connected to several other neural networks as part of an overall aggregate neural network.

Inputs 402-1 through 402-*m* represent the inputs to neural network 400. In this embodiment, inputs 402-1 through 402-*m* do not necessarily represent different inputs. Rather, inputs 402-1 through 402-*m* represent the same input that is sent to each first-layer neuron (neurons 404-1 through 404-*m*) in neural network 400. In some embodiments, the number of inputs 402-1 through 402-*m* (i.e., the number represented by m) can equal (and thus be determined by) the number of first-layer neurons in the network. In other embodiments, neural network 400 can incorporate 1 or more bias neurons in the first layer, in which case the number of inputs 402-1 through 402-*m* can equal the number of first-layer neurons in the network minus the number of first-layer bias neurons.

In some embodiments, a single input (e.g., input 402-1) can be input into the neural network. In such an embodiment, the first layer of neural network 400 can comprise a single neuron 402, which can propagate the input to the second layer of neurons. In some embodiments, the inputs 402-1 through 402-*m* are each a plurality of training documents configured to train personal information sniffer 115 how to identify the associated type of personal information.

Inputs 402-1 through 402-*m* can comprise one or more values correlating to types of personal information in a corpus. Neural network 400 comprises 5 layers of neurons (referred to as layers 404, 406, 408, 410, and 412, respectively corresponding to illustrated nodes 404-1 to 404-*m*, nodes 406-1 to 406-*n*, nodes 408-1 to 408-*o*, nodes 410-1 to 410-*p*, and node 412). In some embodiments, neural network 400 can have more than 5 layers or fewer than 5 layers. Each layer can comprise the same number of neurons as any other layer, more neurons than any other layer, fewer neurons than any other layer, or more neurons than some layers and fewer neurons than other layers.

In the embodiment illustrated in FIG. 4, layer 412 is treated as the output layer. Layer 412 can output a probability (e.g., likelihood a particular chunk of data is type A personal information). For example, layer 412 can output the probability that a string of text is a particular type of personal information. In the embodiment illustrated in FIG. 4, no bias neurons are shown in neural network 400. However, in some embodiments, each layer in neural network 400 can contain one or more bias neurons. Although layer 412 is shown having one output neuron (node 412), in other embodiments, layer 412 contains more than one output neuron.

Layers 404-412 can each comprise an activation function. The activation function utilized can be, for example, a rectified linear unit (ReLU) function, a SoftPlus function, a Soft step function, or others. Each layer can use the same activation function but can also transform the input or output of the layer independently of, or dependent upon, the ReLU function. This is also true in embodiments with more or fewer layers than are illustrated here.

Layer 412 is the output layer. In this embodiment, node 412 produces outputs 414 and 416. Outputs 414 and 416 represent complementary probabilities that a target event will or will not occur. In some embodiments, outputs 414 and 416 represent the overall confidence score, and/or type confidence scores. In some embodiments, there is an output node for each type confidence score (e.g., each type of personal information). In some embodiments, there is an output node for the overall confidence score. In some embodiments, outputs 414 and 416 can each be between 0.0 and 1.0 and can add up to 1.0. In such embodiments, a probability of 1.0 can represent a projected absolute certainty (e.g., if output 414 were 1.0, the projected chance that the target event would occur would be 100%, whereas if output 416 were 0.0, the projected chance that the target event would not occur would be 100%).

Figure 5:
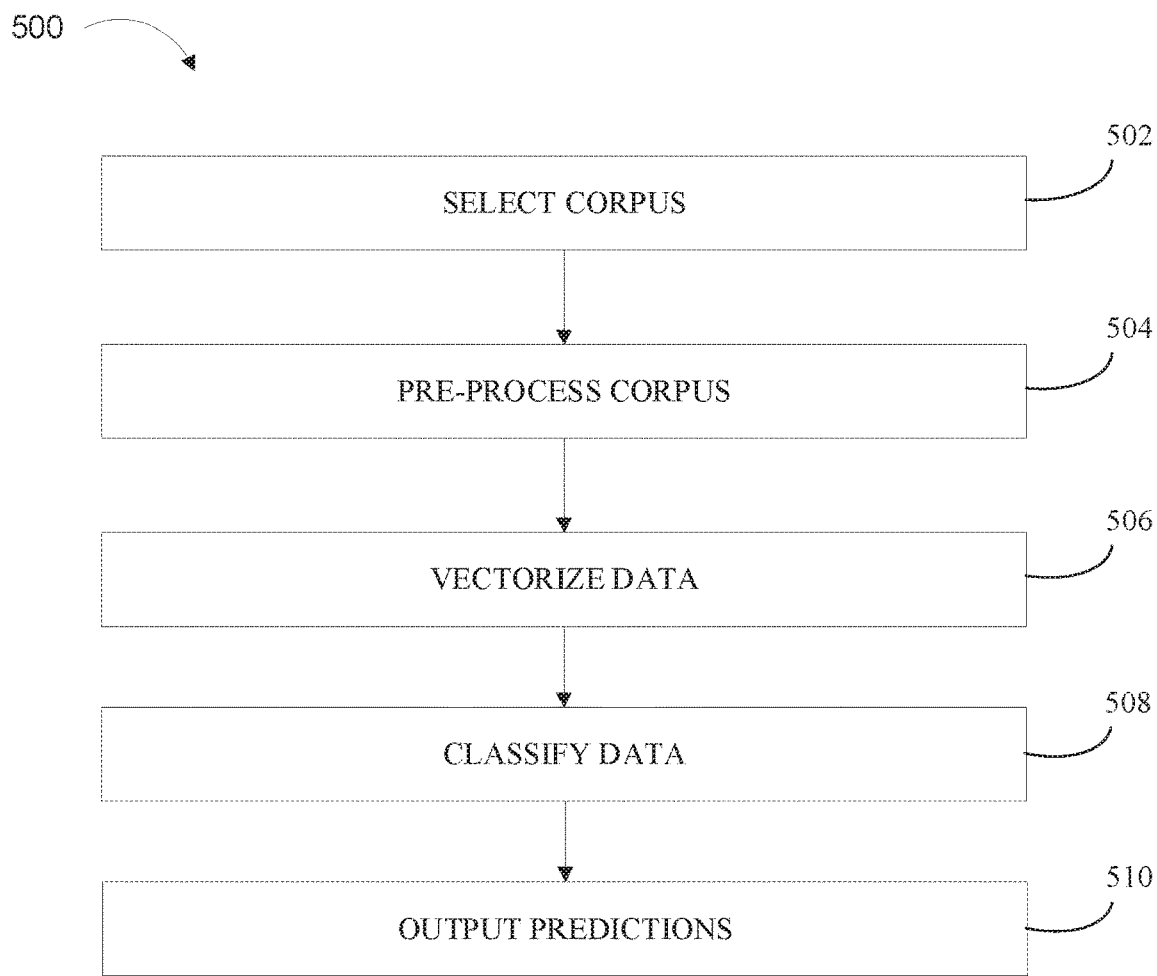
FIG. 5 illustrates a block diagram of an example method of predicting type of personal information, in accordance with some embodiments of the present disclosure.

FIG. 5 depicts a flowchart of an example method, method 500, for predicting types of personal information in a corpus stored in a computing environment (e.g., computing environment 100 and/or computer system 110). One or more of the advantages and improvements described above for identifying and anonymizing personal information can be realized by the method 500, consistent with various embodiments of the present disclosure.

Method 500 can include more or fewer operations than those depicted. Method 500 can include operations in different orders than the order depicted. Likewise, the method 500 can include operations that occur simultaneously rather than sequentially. Many modifications to the depicted method may be made by those skilled in the art without departing from the spirit and scope of the present disclosure. Method 500 can be implemented by one or more processors, a personal information manager (e.g., personal information manager 105 of FIG. 1), a computing device (e.g., computer system 110 of FIG. 1), or a different combination of hardware and/or software. In various embodiments, the various operations of method 500 are performed by one or more of personal information manager 105, computer system 110, user system 130, training database 150, and/or other computing devices. In some embodiments, method 500 occurs during operation 204 of FIG. 2 and/or operation 306 of FIG. 3. In some embodiments, method 500 utilizes neural network 400 of FIG. 4.

At operation 502, personal information manager 105 selects a corpus. In some embodiments, operation 502 is consistent with operation 202 of FIG. 2, and/or operation 304 of FIG. 3. In some embodiments, the corpus is data corpus 140. In some embodiments, the corpus selected is a portion of the data in data corpus 140. In some embodiments, the corpus is a continuous stream of incoming data. In some embodiments, the corpus is all, or a portion of data saved in a database.

At operation 504, personal information manager 105 pre-processes the corpus. In some embodiments, pre-processing includes putting the corpus in a state such that personal information sniffer 115 can analyze for personal information. In some embodiments, pre-processing includes removing stop words and replacing common tokens with specific identifiers. For example, a number "14" is replaced with "<<<natural_numb>>>", "1.15" becomes "<<<decimal_num>>>", and "Billy" becomes "<<<person_name>>>". This can prevent the model from overfitting classes with high variance. In some embodiments, Scikit-Learn's® tokenizer and classifiers are used to pre-process the corpus, however, other similar programs with appropriate functionality can also be used.

At operation 506, personal information manager 105 vectorizes the corpus. In some embodiments, vectorizing the corpus puts the data in a state to be fed into personal information sniffer 115. In some embodiments, Apache® UIMA™ is used to vectorize and process the data however, other similar programs with appropriate functionality can also be used.

At operation 508, personal information manager 105 classifies the data. In some embodiments, the classification is performed by a classifier (or classifying module). In some embodiments, the classifier analyzes the vectorized data and assigns classifications of types to pertinent parts of the data.

At operation 510, personal information manager 105 predicts the types of personal information in the corpus. In some embodiments, the prediction includes calculating type confidence levels for each type of personal information.

Figure 6:
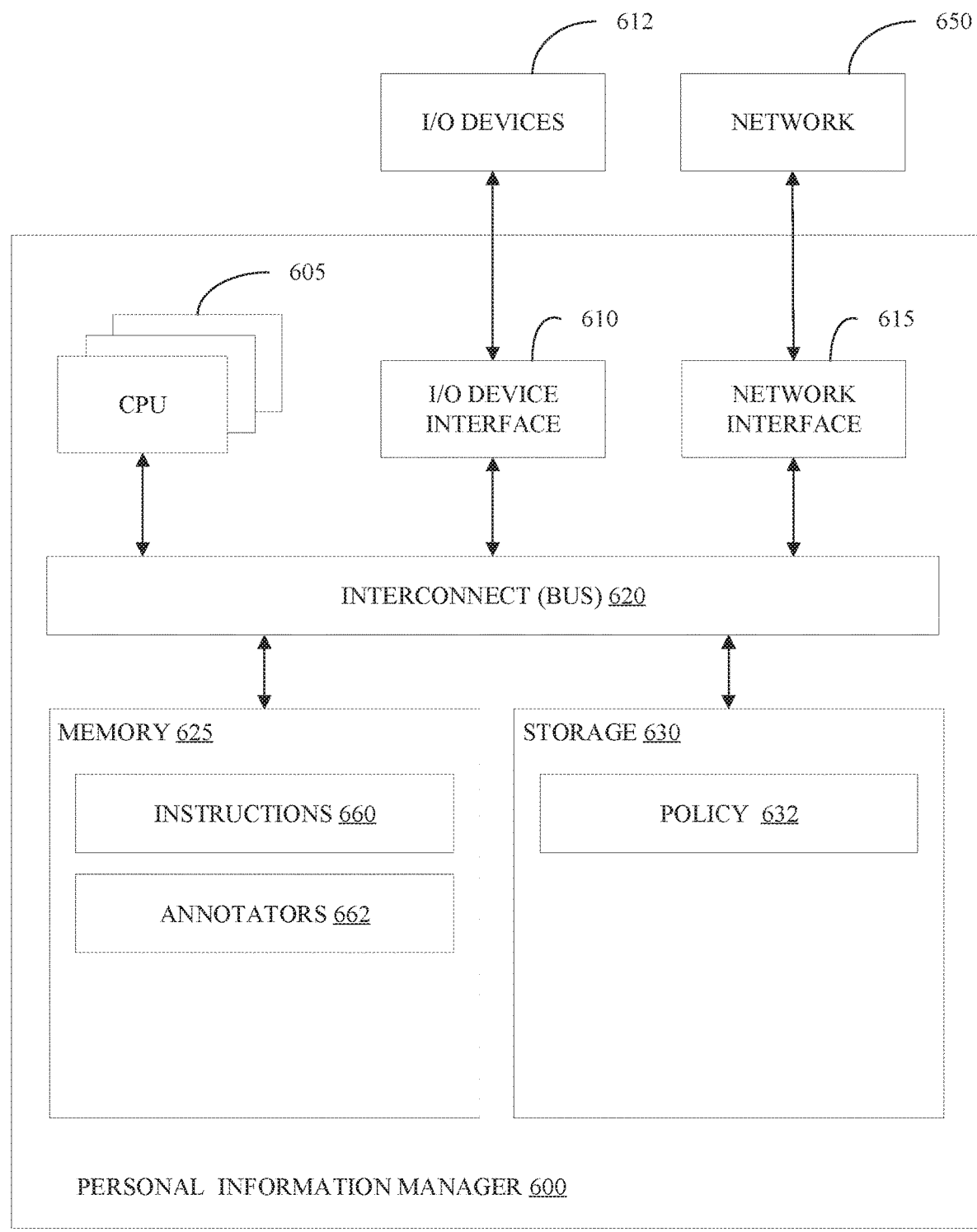
FIG. 6 illustrates a block diagram of an example personal information manager, in accordance with various embodiments of the present disclosure.

FIG. 6 illustrates a block diagram of an example personal information manager 600 in accordance with some embodiments of the present disclosure. In some embodiments personal information manager 600 can perform the methods 200, 300, 340, 370 and/or 500 as described in FIGS. 2, 3A, 3B, 3C, and 5. In some embodiments, personal information manager 600 provides instructions for any of the methods 200, 300, 340, 370, and/or 500 of FIGS. 2, 3A, 3B, 3C, and 5 to a client machine such that the client machine executes the method, or a portion of the method, based on the instructions provided by the personal information manager 600.

The personal information manager 600 includes a memory 625, storage 630, an interconnect 620 (e.g., BUS), one or more CPUs 605 (also referred to as processors herein), an I/O device interface 610, I/O devices 612, and a network interface 615.

Each CPU 605 retrieves and executes programming instructions stored in the memory 625 or storage 630. The interconnect 620 is used to move data, such as programming instructions, between the CPUs 605, I/O device interface 610, storage 630, network interface 615, and memory 625. The interconnect 620 can be implemented using one or more busses. The CPUs 605 can be a single CPU, multiple CPUs, or a single CPU having multiple processing cores in some embodiments. In some embodiments, a CPU 605 can be a digital signal processor (DSP). In some embodiments, CPU 605 can be a digital signal processor (DSP). In some embodiments, CPU 605 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP CPU configurations). Memory 625 is generally included to be representative of a nonvolatile memory, such as a hard disk drive, solid state device (SSD), removable memory cards, optical storage, or flash memory devices. In an alternative embodiment, the storage 630 can be replaced by storage area-network (SAN) deices, the cloud, or other devices connected to the personal information manager 600 via the I/O device interface 610 or a network 650 via the network interface 615.

In some embodiments, the memory 625 stores instruction 660 and annotators 662, and the storage 630 stores and policy 632. However, in some embodiments, the instructions 660, annotators 662, and policy 632 are stored partially in memory 625 and partially in storage 630, or they are stored entirely in memory 625 or entirely in storage 630, or they are accessed over a network 650 via the network interface 615.

Instructions 660 can be processor-executable instructions for performing any portion of, or all of, any of the methods 200, 300, 340, 370 and/or 500 of FIGS. 2, 3A, 3B, 3C, and 5

Annotators 662 are processes that are configured to identify specific instances of personal information. In some embodiments, annotators 662 are consistent with annotators 120 of FIG. 1.

Policy 632 is a collection of editable rules that assist in detection and anonymization of personal information. In some embodiments, policy 632 is consistent with policy 145 of FIG. 1.

In some embodiments, the I/O devices 612 include an interface capable of presenting information and receiving input. For example, I/O device 612 can present information to a user interacting with personal information manager 600 and receive input from the user.

Personal information manager 600 is connected to the network 650 via the network interface 615. Network 650 can comprise a physical, wireless, cellular, or different network.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instruction can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instruction can also be stored in a computer readable storage medium that can direct a computer, a programmable data processing apparatus, and/or other devices to function in a particular manner, such that the computer readable storage medium having instructions stored therein comprises an article of manufacture including instructions which implement aspect of the function/act specified in the flowchart and/or block diagram block or blocks.

The computer readable program instruction can also be loaded onto a computer, other programmable data processing apparatus, or other device to cause a series of operations steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to some embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 660 of FIG. 6 and/or any software configured to perform any subset of the methods described with respect to FIGS. 2-3) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
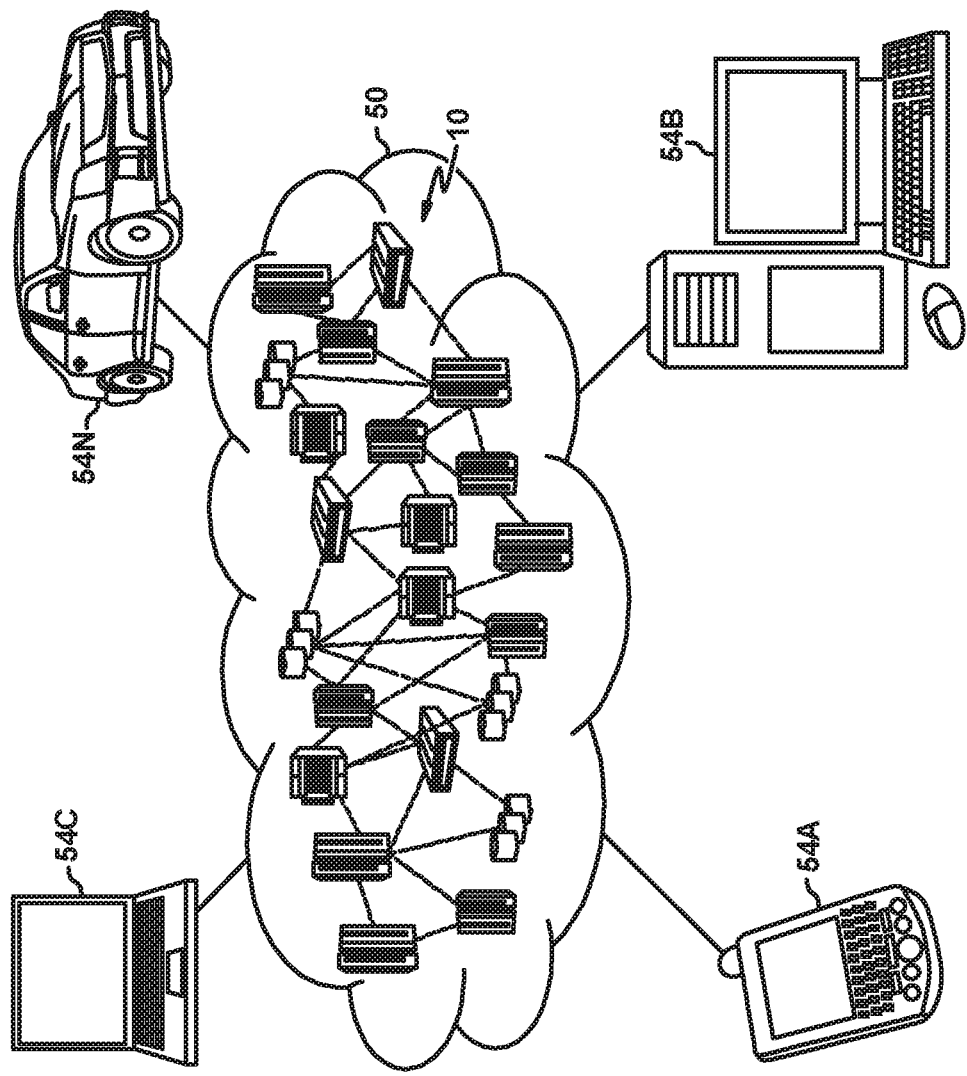
FIG. 7 depicts a cloud computing environment, in accordance with some embodiments of the present disclosure.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
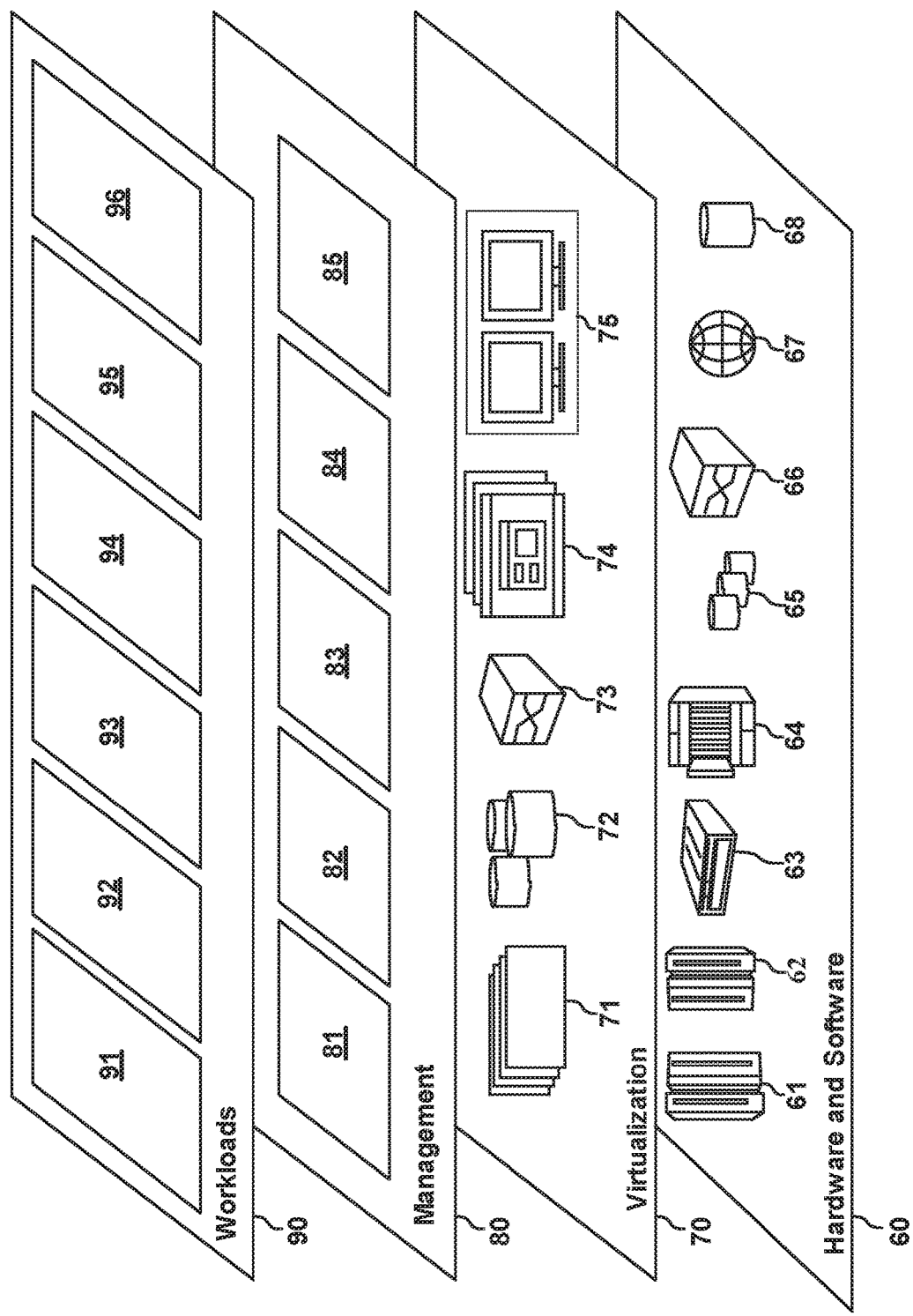
FIG. 8 depicts abstraction model layers, in accordance with some embodiments of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and personal information identification 96.

What is claimed is:

1. A computer-implemented method comprising:
analyzing a first corpus with a personal information sniffer, wherein the first corpus includes unstructured text, wherein the personal information sniffer is configured to detect a set of types of personal information, and wherein the personal information sniffer produces a first set of results;
analyzing, in response to the analyzing the first corpus with the personal information sniffer, the first corpus with each annotator of a set of annotators, wherein each annotator is configured to identify instances of a type of personal information in the corpus, and wherein the set of annotators produces a second set of results;
comparing, in response to the analyzing the first corpus with the set of annotators, the first set of results and the second set of results;
determining, the first set of results does not match the second set of results;
updating, based on determining the results do not match, the personal information sniffer, wherein the results do not match based on the second set of results including a first instance of personal information and the first set of results not including the first instance of personal information;
annotating, each instance of each type of personal information; and
anonymizing, each annotation.

2. The computer-implemented method of claim 1, further comprising:
saving, in response to determining the results do not match, a first document, wherein the first document comprises the first corpus.

3. The computer-implemented method of claim 2, further comprising:
selecting, by a randomizer, the first corpus to be analyzed by the personal information sniffer and the set of annotators.

4. The computer-implemented method of claim 3, wherein the first document is part of a document stream, wherein the randomizer is configured to select a set of documents from the document stream, and wherein the set of documents is selected based on a policy.

5. The computer-implemented method of claim 4, wherein the policy is configured by a user.

6. The computer-implemented method of claim 4, further comprising:
identifying a second corpus, wherein the second corpus is part of a second document, wherein the second document is part of the document stream, and wherein the second document is not selected by the randomizer;
analyzing the first corpus with the personal information sniffer;
determining, by the personal information sniffer, the second corpus does not contain any instances personal information; and
identifying a third corpus, in response to determining the second corpus does not contain any instances of personal information.

7. The computer-implemented method of claim 1, further comprising:
training the personal information sniffer, wherein the training comprises:
feeding a first training document to the personal information sniffer, wherein the first training document includes at least one instance of a second type of personal information; and
determining the personal information sniffer detected the at least one instance of the second type of personal information in the first training document.

8. The computer-implemented method of claim 7, wherein the personal information sniffer is trained using a synthetic minority over-sampling technique (SMOTE).

9. The computer-implemented method of claim 1, further comprising:
calculating an overall confidence score, wherein the overall confidence score represents a likelihood each instance of personal information in the corpus is annotated.

10. The computer-implemented method of claim 1, wherein the anonymizing is based on a policy, wherein the anonymizing is selected from a group consisting of: redaction, deletion, replacement, hashing, generalization, and dictionary-substitution.

11. The computer-implemented method of claim 1, wherein updating the personal information sniffer changes the personal information sniffer such that the first set of results matches the second set of results.

12. The computer-implemented method of claim 1, wherein the method is performed by a personal information manager executing program instructions, and wherein the program instructions are downloaded from a remote data processing system.

13. A system comprising:
a processor; and
a computer-readable storage medium communicatively coupled to the processor and storing program instructions which, when executed by the processor, are configured to cause the processor to perform a method comprising:
analyzing a first corpus with a personal information sniffer, wherein the first corpus includes unstructured text, wherein the personal information sniffer is configured to detect a set of types of personal information, and wherein the personal information sniffer produces a first set of results;
analyzing, in response to the analyzing the first corpus with the personal information sniffer, the first corpus with each annotator of a set of annotators, wherein each annotator is configured to identify instances of a type of personal information in the corpus, and wherein the set of annotators produces a second set of results;
comparing, in response to the analyzing the first corpus with the set of annotators, the first set of results and the second set of results;
determining, the first set of results does not match the second set of results;
updating, based on determining the results do not match, the personal information sniffer, wherein the results do not match based on the second set of results including a first instance of personal information and the first set of results not including the first instance of personal information;

annotating, each instance of each type of personal information; and anonymizing, each annotation.

14. The system of claim 13, wherein the program instructions are further configured to cause the processor to perform the method, further comprising:

saving, in response to the determining, a first document, wherein the first document comprises the first corpus.

15. The system of claim 13, wherein the personal information sniffer consumes fewer computing resources than the set of annotators.

16. The system of claim 14, wherein the program instructions are further configured to cause the processor to perform the method further comprising:

selecting, by a randomizer, the first corpus to be analyzed by the personal information sniffer and the set of annotators.

17. A computer program product, the computer program product comprising a computer readable storage medium having program instructions embodied therewith, the program instructions executable by a processing unit to cause the processing unit to perform a method comprising:

analyzing a first corpus with a personal information sniffer, wherein the first corpus includes unstructured text, wherein the personal information sniffer is configured to detect a set of types of personal information, and wherein the personal information sniffer produces a first set of results;

analyzing, in response to the analyzing the first corpus with the personal information sniffer, the first corpus with each annotator of a set of annotators, wherein each annotator is configured to identify instances of a type of personal information in the corpus, and wherein the set of annotators produces a second set of results;

comparing, in response to the analyzing the first corpus with the set of annotators, the first set of results and the second set of results;

determining, the first set of results does not match the second set of results;

updating, based on determining the results do not match, the personal information sniffer, wherein the results do not match based on the second set of results including a first instance of personal information and the first set of results not including the first instance of personal information;

annotating, each instance of each type of personal information; and anonymizing, each annotation.

18. The computer program product of claim of claim 17, wherein the program instructions are further configured to cause the processing unit to perform the method further comprising:

saving, in response to the determining, a first document, wherein the first document comprises the first corpus.

19. The computer program product of claim of claim 17, wherein the updating changes the personal information sniffer such that the first set of results matches the second set of results.

* * * * *